(No Model.) 9 Sheets—Sheet 3.

H. CLAY.
PNEUMATIC DISPATCH OR TRANSIT SYSTEM.

No. 489,931. Patented Jan. 17, 1893.

WITNESSES:
Geo. P. Byington
J. R. Miller

INVENTOR
Henry Clay
BY A. J. Van Stavoren
ATTORNEY

(No Model.) 9 Sheets—Sheet 7.

H. CLAY.
PNEUMATIC DISPATCH OR TRANSIT SYSTEM.

No. 489,931. Patented Jan. 17, 1893.

WITNESSES:

INVENTOR
Henry Clay
BY VanStavoren
ATTORNEY

(No Model.)   9 Sheets—Sheet 8.

H. CLAY.
PNEUMATIC DISPATCH OR TRANSIT SYSTEM.

No. 489,931.   Patented Jan. 17, 1893.

WITNESSES:

INVENTOR
Henry Clay
BY
Van Stavorin
ATTORNEY

(No Model.) 9 Sheets—Sheet 9.

H. CLAY.
PNEUMATIC DISPATCH OR TRANSIT SYSTEM.

No. 489,931. Patented Jan. 17, 1893.

WITNESSES:

INVENTOR
Henry Clay
BY
S. J. Van Stavoren
ATTORNEY

UNITED STATES PATENT OFFICE.

HENRY CLAY, OF PHILADELPHIA, PENNSYLVANIA, ASSIGNOR TO THE ELECTRIC PNEUMATIC TRANSIT COMPANY, OF SAME PLACE.

PNEUMATIC DISPATCH OR TRANSIT SYSTEM.

SPECIFICATION forming part of Letters Patent No. 489,931, dated January 17, 1893.

Application filed October 26, 1889. Serial No. 328,359. (No model.)

*To all whom it may concern:*

Be it known that I, HENRY CLAY, a citizen of the United States, residing at Philadelphia, in the county of Philadelphia and State of Pennsylvania, have invented certain new and useful Improvements in Pneumatic Dispatch or Transit Systems, of which the following is a specification.

My invention has relation generally to pneumatic dispatch or transit systems for messages, parcels and other matter, and particularly to that system comprising a central or main station having one or more separate tube-circuits or mains leading from and back to the main-station and each tube-circuit having connection with the receiving and transmitting-devices of all the local or substations connected to or included in each tube-circuit, which tube-circuits have at the substations and at other suitable places, switches, electrically controlled or set from the main-station for diverting the carriers from the main line to the sub-stations, which switches are re-set and locked in their normal positions by the movement of the carriers passing them.

My invention has for its objects mainly to provide a complete system of pneumatic dispatch or transit in which any number of carriers may be sent successively and following one another from the main station to any one of the sub-stations or from any one of the latter to the main-station which carriers simultaneously travel through the main line tube to their destination without interference with one another and at the same rate of speed from end to end of their path of travel in the tube; to provide for inserting the carriers into and delivering them from the system at any main or sub-station without permanently stopping the travel of any of the carriers in the tubes and without breaking or intercepting the continuity of the motive power in the tubes and without permitting any part of said power to escape from the tubes at the stations where the carriers are inserted into and delivered from the system; to provide for shunting the motive power in the tubes and the traveling carriers around a broken or faulty carrier diverting-switch in a main or other tube and for repairing said faulty switch without necessitating stoppage of traffic on any part of or on the whole line as has heretofore been the case; to provide for preventing a carrier about to pass out from a substation into the main line, blocking or jamming a carrier traveling in the main-line and approaching the junction of said outlet of the substation and main-line; and to provide flowing air currents for the motive power for propelling the carriers in contra-distinction to vacuum or air pressure force heretofore used, which flowing air currents have the same power from end to end of the line to propel the carriers at the same rate of speed from their initial to their terminal point of travel, and flow through all the substation-tubes as well as the main-line to admit of any number of carriers being inserted into the system and following one another at a uniform speed without gaining upon one another. For the accomplishment of which, one end of each tube-circuit at the central-station is connected to an air reservoir or tank which in turn has a pipe connection with an air pump or blower and the other end of each of said circuits is open to the external air and if desired may be provided with a governor for regulating the escape of the air from or its admittance to said open-end for effecting a continuous flow of air or circulation through the main and substation tubes from end to end of the circuit for propelling the carriers.

At the main station and at the sub-stations are separate transmitting and receiving devices. The transmitting devices are so constructed that they operate to convey a carrier into the current or flow of air in the tube without interfering with or cutting off said flow of air to the sub-station and without permitting any part of the flow of air to escape from the tube. The receiving devices are so constructed that as soon as a carrier enters the receiver it ceases to be subject to the propelling force of the air currents and its velocity is utilized to actuate mechanism for closing or sealing the receiver to prevent the escape of any part of the air current from the tube and also to effect the delivery of the carrier from the receiver. At the junction of the main tube and the inlet tube for a substation or for a branch tube are located carrier diverting switches controlled from the main or central station and reset to normal position by the carriers as they pass by said switches. At the junction of the main-tube and the outlet tube from the sub-stations are pivoted levers operated by a carrier either in the main-tube or in said outlet-tube to prevent blocking of carriers at the junction of the main-tube and the sub-station outlet tube. In the main tube between the junctions with it of the inlet and outlet-tubes of a sub-station, is inserted a suitable valve which is normally closed but offers but little resistance to the passage of the carriers, which valve is employed to divert or shunt the flow of air from the main tube to and through the sub-stations and back again to the main tube in order that the flow of air will be through the main and sub-station tubes and that a carrier diverted into the sub-station may be propelled through the inlet pipe thereof to the receiver at said station by the same velocity or speed that it is propelled through the main tube. At the junctions of the main tube and the sub-station inlet and outlet tubes or at any other suitable places in the circuit are located shunt-plugs or valves connected also by a separate or bridge-pipe for shunting the path for the carrier and flow of air from the main tube through said plugs and bridge-tube when the switches, levers or other part of the main tube between said plugs are faulty or need repairing or replacement of parts.

My invention accordingly consists of the pneumatic dispatch tube system, method of propelling the carriers, and the combinations, constructions and arrangements of parts as hereinafter described in the specification and pointed out in the claims.

Reference is had to the accompanying drawings wherein Fig. 15, is an elevation of the same showing the delivery tube in two positions as in Fig. 9; Fig. 16, is a view similar to Fig. 10, showing detail modifications; Fig. 17, is a section on line $v'$—$v'$ Fig. 16; Fig. 18, is a section on line $x'$—$x'$ Fig. 16, and Fig. 19, is a plan of valve at the inlet end of the receiver shown in Fig. 16; Fig. 20, is a plan, partly broken away of the transmitting device for the sub-stations, showing the movable part of the same in position for the insertion of a carrier into the same preparatory to conveying it into the path of the air-flow or power in the tube; Fig. 21 is a section on the line 1—1 Fig. 20; Fig. 22 is a section on the line 2—2 Fig. 20; Fig. 23, is a plan, partly broken away, and in section, of the transmitter for the main station showing a carrier inserted into the same and about to be conveyed into the path of the air-flow in the tube; Fig. 24, is a section on the line 3—3 Fig. 23; Fig. 24$^a$, is a section on the line 4—4 Fig. 23; Fig. 36, Fig. 38, is a broken sectional elevation on line $y^2$ $y^2$ Fig. 36.

Figure 1:
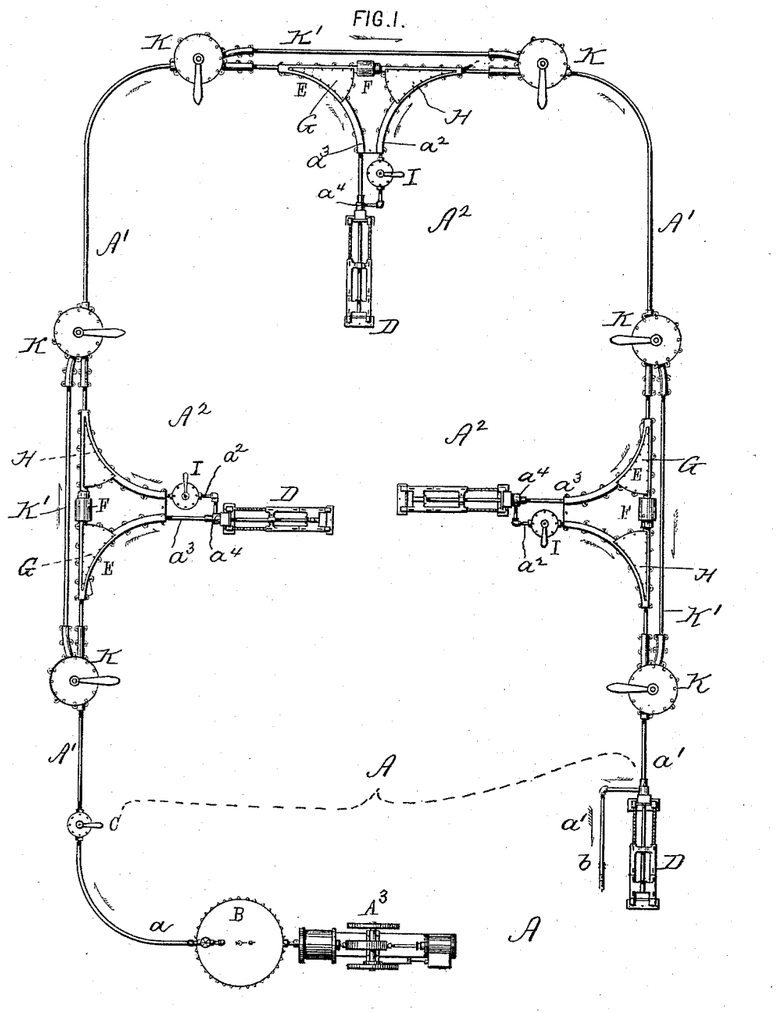
Figure 1, is a diagram of a single tube circuit proceeding from a main-station to and including the sub-stations and leading back to the main-station, embodying my improvements.

A Fig. 1 represents the main or central station from which the tube-circuit A' leads out and to which it returns; $a$ being the outgoing end and $a'$ the incoming end, the said tube being practically continuous from end to end, and including any number of sub-stations $A^2$ $A^2$. The outgoing end $a$ of a single tube-circuit A' as shown in Fig. 1, is connected to or includes an air reservoir or chamber B which has a pipe connection with a pump or blower or air current producing mechanism $A^3$. This mechanism may be located immediately at the central or main station or otherwise as desired. Included in end $a$ of tube A' is the main station carrier transmitter C to be hereinafter described. The other end $a'$ of tube A' is connected with the main station carrier receiving and delivery device D to be hereinafter explained and said end $a'$ is open to the atmosphere. If desired it may be provided with any suitable form of governor or valve $b$ for a purpose hereinafter to be explained but which is not essential and can be dispensed with.

The substations $A^2$ are arranged for and have the following described devices. The outgoing pipe $a^2$ and incoming pipe $a^3$ thereof are connected to or form a loop from the main tube A' by coupling boxes E through which tube A' and the substation tubes $a^2$ $a^3$ are continued the latter curving into the former, see Fig. 3, and containing an air current diverting valve F in the line of tube A', a carrier diverting switch G at the junction of tube A' and sub-station incoming tube $a^3$ and carrier anti-blocking or jamming lever devices H at the junction of the tube A' and sub-station outgoing tube $a^2$ together with the electrical or other actuating devices for the carrier diverting switch G as hereinafter explained.

To the end of sub-station incoming tube $a^3$ is attached a receiving and delivery device D and the sub-station outgoing-tube $a^2$ connects with its incoming tube $a^3$ in advance of the receiving and delivery device D as indicated at $a^4$ and includes a sub-station transmitting device I. All of the sub-stations are similarly equipped and the receiving and delivery devices D for the sub and main stations are alike, while the transmitting devices for the main station differs from that for the sub-stations in detail as hereinafter explained. In the main tube A' adjacent to the ends of the coupling boxes E are included shunt-plugs K connected by a separate or a bridge tube K' for shunting the air current and carrier around a faulty place in the line A' as hereinafter more fully set forth.

In order that the general construction and operation of the entire system may be more readily comprehended I will first describe the above noted parts and their operation in detail.

Figures 20, 21, 22, 23, 24, 24A:
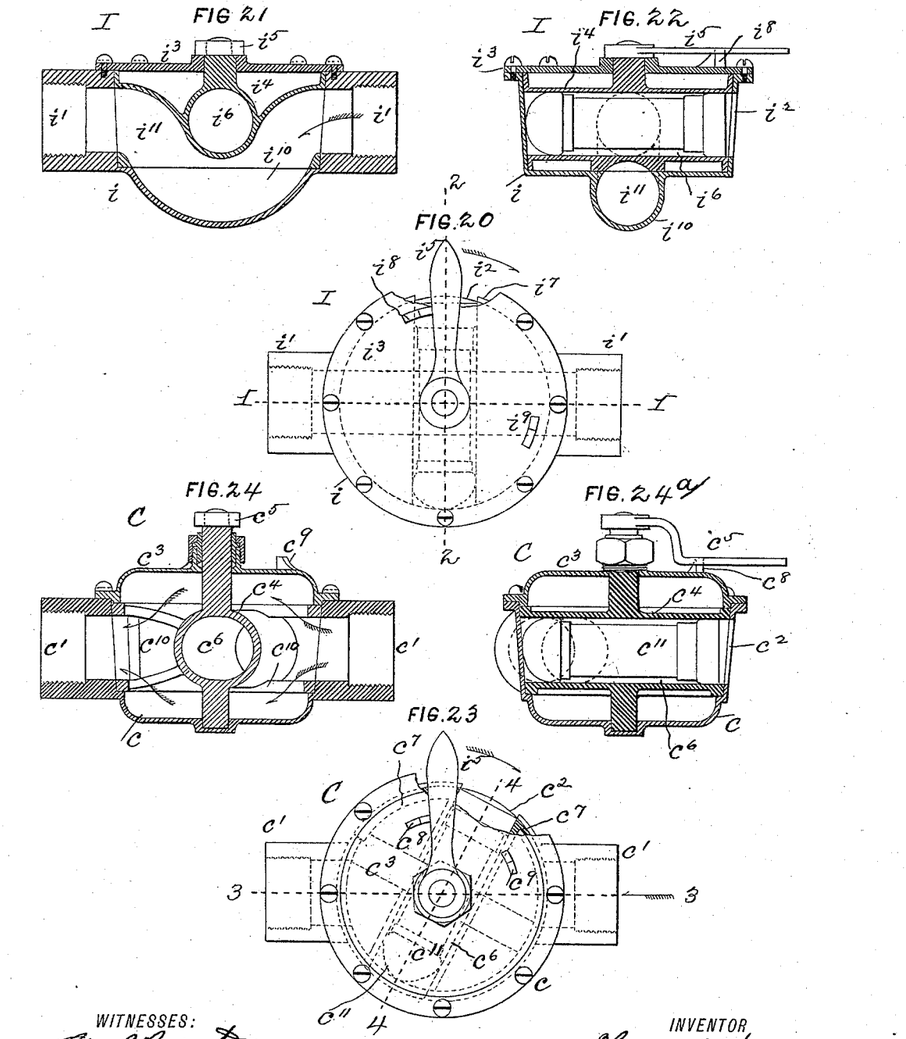

The main-station transmitter C shown more plainly in detail in Figs. 23 to $24^a$, inclusive, consists essentially of a cylindrical casing $c$ having preferably diametrically located coupling-ends $c'$ $c'$ for connection with and continuing tube A' through said casing, a side opening $c^2$ intermediate of said coupling ends, a removable cap or cover $c^3$ in which and in the bottom of the casing is journaled a skeleton-plug $c^4$ the upper end of the shaft of which projects through a stuffing-box on the top of cover $c^3$ and is provided with a turning handle or lever $c^5$. The plug $c^4$ has a diametrical passage way or channel $c^6$ of a diameter equal to the bore of tube A'. At one end of passage way $c^6$ on each side of said end, are peripheral flanges $c^7$, see more plainly Fig. 23, which flanges are provided to seal the side opening $c^2$ in the casing when the skeleton-plug $c^4$ is rotated in the casing as hereinafter described.

Upon the top of cover $c^3$ at any suitable location are two stops $c^8$ $c^9$ for limiting the movement of the plug-lever $c^5$. When the plug $c^4$ is in the position indicated in Figs. 23 and $24^a$, with its handle $c^5$ against the stop $c^8$, and the plug-opening $c^6$ is turned out of the line of tube A' and registers with the casing opening $c^2$ as indicated, but this position of the plug does not interfere with nor stop the flow of air or motor power through the transmitter, because such flow passes through the skeleton-part $c^{10}$ of the plug as indicated by the arrows in Fig. 24. Such described position of the plug $c^4$ is the one which it is caused to assume when a carrier is to be inserted into the plug-way $c^6$ preparatory to moving it into the line of way of the tube A' the insertion of a carrier in said plug way being indicated by dotted lines $c^{11}$ in Fig. 23. As soon as the carrier is inserted through the casing opening $c^2$ into plug-way $c^6$, the plug is reversely turned until its handle $c^5$ impinges against stop $c^9$, the plug way $c^6$ is then brought into alignment with tube A' and the carrier is in the path of said tube and instantly partakes of the motion and velocity of the air flowing through said tube. In moving the plug to either of said described positions the plug-flanges $c^7$ move across the casing-opening $c^2$ to keep it sealed when the plug-way $c^6$ is not in registration therewith. A transmitter so constructed and operated, it will be noted, admits of rapidly delivering any number of successive carriers to tube A' without permitting any escape of air or motive power and without interfering with the flow of air-currents and the travel of the carriers in tube A′; the normal position of the plug-way $c^6$ being in alignment with the tube A′.

The sub-station transmitter I, see Figs. 20 to 22 inclusive consists of a casing $i$ with diametrical openings $i'$ to complete the passage of the out-going tube $a^2$ to the casing, a side opening $i^2$ intermediate of said openings, a removable cap $i^3$, a plug $i^4$ having lever or handle $i^5$, passageway or channel $i^6$, flanges or wall $i^7$ for sealing casing opening $i^2$, and limiting stops $i^8$ and $i^9$, and is substantially the same as described for the main-station transmitter, except that the bottom of the casing $i$ is depressed as shown at $i^{10}$ Figs. 21 and 22, and a way or channel $i^{11}$ at right angles to plug-way $i^6$ is formed in the plug to form an air-conducting passage through the transmitter when its plug $i^4$ is turned to bring its way $i^6$ into registration with casing-opening $i^2$ for inserting the carrier, as indicated in Fig. 20. As the way $i^{11}$ is simply an air passage, the wall or flange $i^7$ of the plug $i^4$ between the ways $i^6$ and $i^{11}$ admit of momentarily checking the flow of air in the sub-station during the very small interval of time that the plug is being moved to place and bringing the inserted carrier in alignment with said tubes so that a slight accumulation of air in said tubes is obtained to impart to the carrier its full initial movement directly it enters or is placed in the path of the tube $a^2$ or the air current therein, and hence the air-channel $i^{11}$ has no function except during the insertion of the carrier into the system at the sub-stations, the normal position of the plug-way $i^6$ being in alignment with the sub-station tube $a^2$.

The sub-station transmitter, it will be noted, has the same advantages as that of the main-station transmitter with the addition that it provides for imparting a full initial movement to the carriers, as soon as they are inserted into the system.

Figure 4:
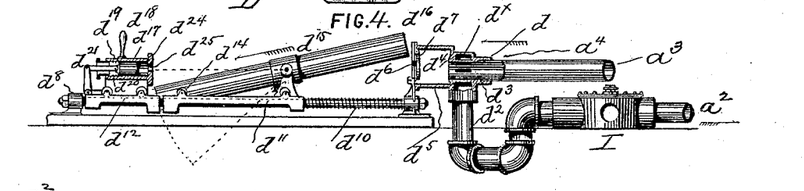
Fig. 4, is an elevation, partly sectional, of the sub-station inlet and outlet tubes and the receiving and transmitting devices respectively connected thereto.
Figure 8:
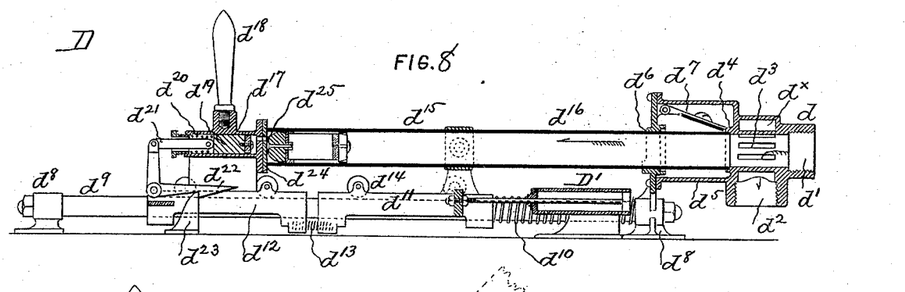
Fig. 8, is a section, partly in elevation, drawn to an enlarged scale, of the carrier receiving and delivering devices at the stations, showing the delivery tube in position to receive a carrier.
Figure 9:
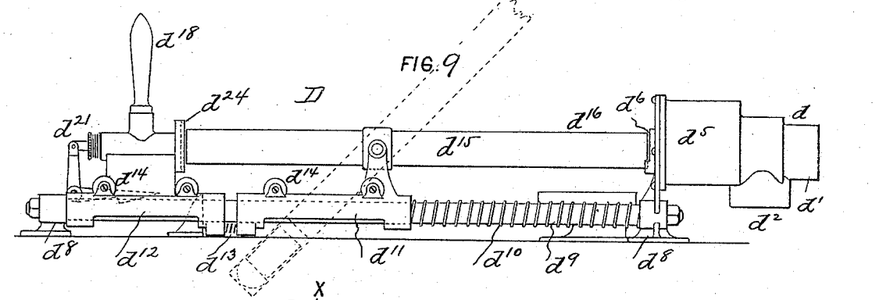
Fig. 9, is an elevation of same showing by full lines the delivery tube in position ready to deliver the carrier and by dotted lines its position in delivering the carrier.

The main station and sub-station receiver and delivery device D are alike in construction and a description of one answers for both, reference being had to Figs. 8 and 9. It consists of a coupling $d$ having inlet and outlet openings $d'$ $d^2$ to which the main or sub-station tubes are connected, said openings being preferably located at an angle to one another. The continuation of the inlet tube opening $d'$ in said coupling is perforated as indicated at $d^3$ Fig. 8, surrounding which perforated part of said inlet $d'$, is a duct or way $d^x$ leading to the outlet tube $d^2$ so that the current of air entering tube $d'$ is diverted or passes through the perforations $d^3$ into way $d^x$ and thence on to the outlet-tube $d^2$ to continue its travel through the system, see Fig. 4. At the terminal end of the inlet tube $d'$ is an annular flange or seat $d^4$, and surrounding this seat is a box or chamber $d^5$ in the outer end of which is an opening $d^6$ having a flanged inner end or seat closed by a pivoted gravity valve $d^7$. The coupling $d$ is firmly secured to brackets $d^8$ in which are mounted parallel guide rods $d^9$, upon one end of each of which preferably, are spiral springs $d^{10}$ acting against a suitably constructed carriage $d^{11}$ mounted and sliding on said guide rods. $d^{12}$ is another carriage similarly mounted and moving, and, if desired, these carriages are separated from each other by buffer springs $d^{13}$. These carriages may have roller bearings $d^{14}$ on the guide rods $d^9$ to diminish their friction bearing on the guide-rods, or they may be otherwise mounted thereon as desired.

Upon the carriage $d^{11}$ is pivoted a tube or barrel $d^{15}$ the end $d^{16}$ of which is so weighted as to cause the barrel to normally assume a horizontal position. Upon the carriage $d^{12}$ is a hollow head block $d^{17}$ having a handle $d^{18}$. In the bore of the head block is a piston $d^{19}$, a reaction spring $d^{20}$ for said piston which has a link connection $d^{21}$ with a pawl or catch lever $d^{22}$ pivoted to carriage $d^{12}$ for engagement with a fixed stop $d^{23}$. The inner face of the head block is provided with a seat $d^{24}$ which has an opening $d^{25}$ leading into the bore of the head-block $d^{17}$. The barrel or tube $d^{15}$ when in its normal position is in line with the opening $d^6$ in chamber $d^5$ of coupling $d$ and when not in use it and the carriages $d^{11}$ and $d^{12}$ are in the position shown in full lines of Fig. 9, that is to say the carriages are moved to the left of said figure to withdraw the end $d^{16}$ of barrel $d^{15}$ out of the chamber $d^5$ of coupling $d$ and the opening $d^6$ of said chamber is closed by the valve $d^7$ which then closes by gravity upon the inner flange or opening $d^6$ to prevent the escape of air from said coupling.

When a carrier is to be received, the carriages $d^{11}$ and $d^{12}$ are moved to the right, the operator doing so by means of the handle $d^{18}$ causing the end $d^{16}$ of barrel $d^{15}$ to enter opening $d^6$ of chamber $d^5$ raising valve $d^7$ from said opening as it enters the latter. The barrel is moved into chamber $d^5$ until it engages with the flange $d^4$ therein, at which time the pawl $d^{22}$ has moved into engagement with the stop $d^{23}$ to hold all of said movable parts in their adjusted position. In coming to this position the face or seat $d^{24}$ is moved up into sealing contact with the outer end of the barrel $d^{15}$; and to effectually seal the joint between face or seat $d^{24}$ and barrel $d^{15}$, the carriage $d^{12}$ is made separate from the carriage $d^{11}$ and the springs $d^{13}$ are interposed between said carriages so that at the terminal movement of carriage $d^{12}$ it alone moves against the resistance of the springs $d^{13}$ to cause the face or seat $d^{24}$ to exert a pressure on the adjacent end of barrel $d^{15}$ after it has been fully moved to its position, see Fig. 8. A carrier arriving at the box inlet tube $d'$ is propelled by the air into barrel $d^{15}$ until the carrier passes the perforations $d^3$ where the air is then deflected or continues its onward movement to the outlet tube $d^2$. But the momentum of the carrier causes it to continue through barrel $d^{15}$. In its movement therein it compresses the air ahead of it to a sufficient degree so that when it reaches the outer end of the barrel there is enough power to operate or slide the piston $d^{19}$ backward or to the left of Fig. 8. This movement of the piston releases the pawl $d^{22}$ from the stop $d^{23}$ and the reaction of springs $d^{10}$ moves both carriages to the left of Fig. 8, until the barrel $d^{15}$ is withdrawn from coupling chamber $d^5$, at which time its valve $d^7$ falls to seal its opening $d^6$ to prevent escape of air. As the said carriages and barrel $d^{15}$ come to the terminal end of said last described movement, the reaction of springs $d^{18}$ between said carriages, act to slightly move the carriages apart to release the outer end of barrel $d^{15}$ from the seat $d^{24}$ and barrel $d^{15}$ is free to be tilted by the weight of the carrier in its outer end which then overbalances the end $d^{16}$ of said barrel, see Fig. 4. As soon as the latter is tilted as indicated in said figure and by dotted lines Fig. 9, the carrier drops out and the weight of the end $d^{16}$ of the barrel returns it to its normal position.

The foregoing described receiving and delivery device admits of receiving a carrier and automatically delivering it from the system without interfering with the flow of air therein and without escape of air therefrom. The carrier is checked within a limited space by the air cushion formed ahead of it in the barrel $d^{15}$ which cushion is utilized to release the locking mechanism for said device and when released the carrier is automatically ejected from the system.

If it is desired to cushion the action of the springs $d^{10}$ a suitably formed and located air piston and cylinder device D′ may be placed in connection with the carriage $d^{11}$ as indicated in Fig. 8.

Figure 14:
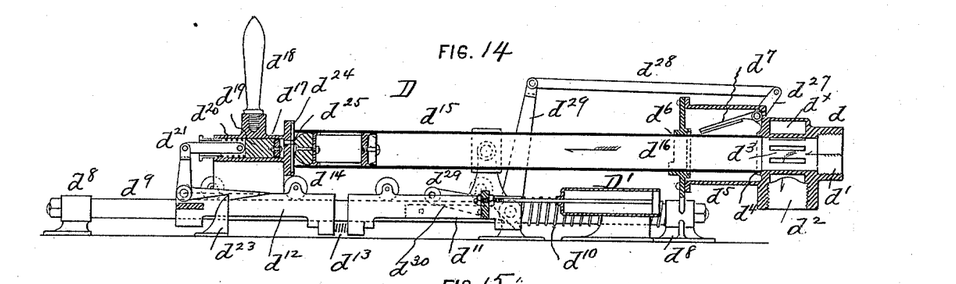
Fig. 14, is a view similar to Fig. 8, showing detail modifications.
Figures 15, 16, 17, 18, 19:
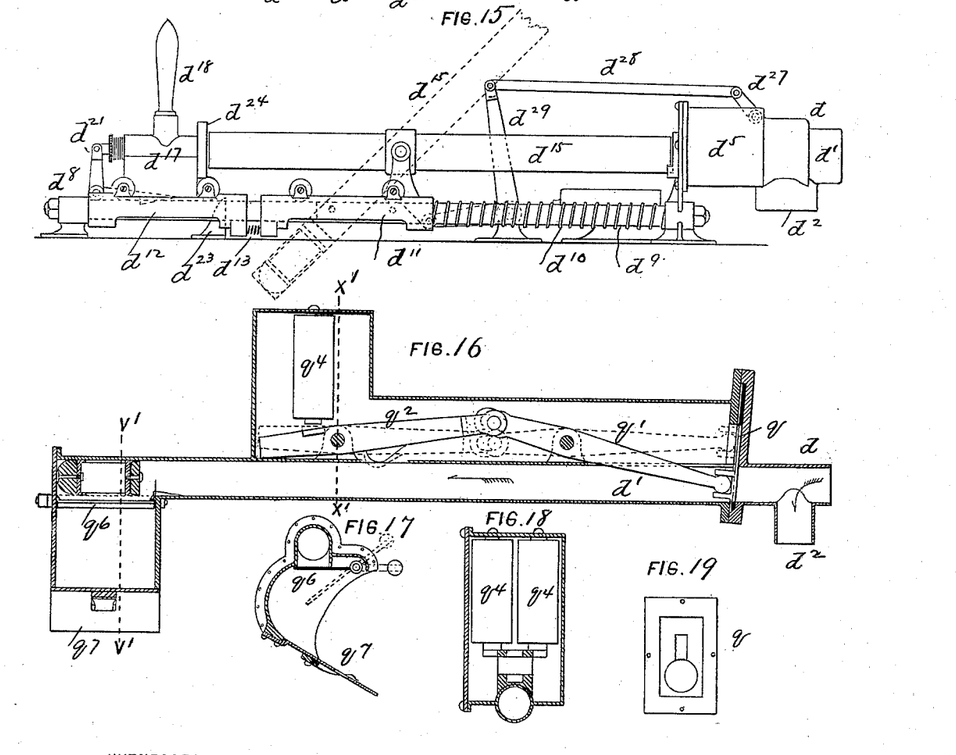

In Figs. 14 and 15, the gravity acting valve $d^7$ for chamber-opening $d^6$ of coupling $d$ is removed therefrom and located to seal the annular flange opening $d^4$ in said chamber $d^5$. In which case said valve is provided with a crank and link connection $d^{27}$ and $d^{28}$ with a pivoted bell-crank lever $d^{29}$, the free end of which engages with an inclined lug or cam $d^{30}$ on carriage $d^{11}$ as it is moved to insert the end $d^{16}$ of the barrel $d^{15}$ into chamber $d^5$; said lug $d^{30}$ and end of lever $d^{29}$ being so located that the contact between them is made and the lever moved to raise said valve out of the way of the end $d^{16}$ of barrel $d^{15}$ as it enters chamber $d^5$.

Figure 3:
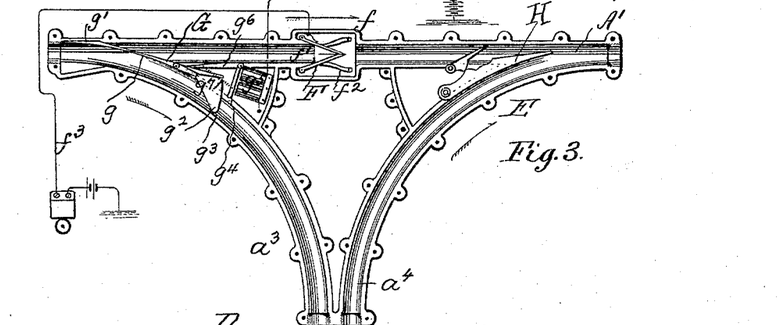
Fig. 3, is a plan of coupling-boxes with top-half or plate removed, for the main tube and inlet and outlet tubes of a sub-station, showing carrier diverting switch, a form of air-current diverting valve and carrier anti-blocking levers located therein and also electrical devices for controlling the movement of said carrier diverting switch from the main station and electrical signaling devices, for indicating at the main station the passage of a carrier through said air current diverting valve.
Figure 32:
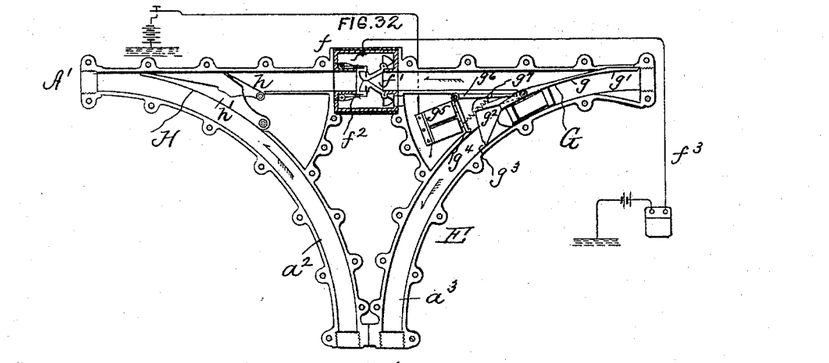
Fig. 32, is a view similar to Fig. 3, showing a modified form of air current diverting valve.
Figure 33:
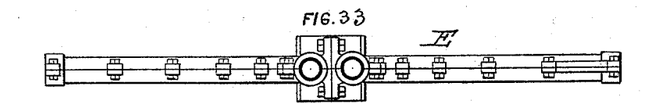
Fig. 33, is an edge view of same.

The coupling boxes E may be of any desired form but for the purpose of facilitating connection of the sub-station inlet and outlet tubes with the main-tube as well as to locate at their junctions the carrier diverting switch G and the anti-blocking levers H, and the air current diverting valve F between said junctions I prefer to construct said boxes in two halves, each half having flanges for bolting them together as shown, and the passages through the coupling boxes for continuing the main and sub-station pipes therethrough, are made as illustrated and heretofore described, see more plainly Figs. 3, 32 and 33.

The valve F may be of any suitable construction. In Fig. 3, it is shown located within a casing $f$ forming part of coupling section or box E and in which casing $f$ the line of the tube-passage A′ through box E is broken to form an end $f'$ which said valve F seals or closes. The valve as shown is composed of two semi-cone shaped halves suitably pivoted and having springs $f^2$ for closing them together which is their normal position in order to deflect the air current from tube A′ to the inlet tube $a^3$ of each sub-station, said air currents passing through the sub-stations by way of the passages $d'$ $d^{\times}$ $d^2$ in the receiver couplings $d$ and thence through the outgoing tube $a^2$ back to the main tube A′. Said valves F however do not obstruct the passage of the carrier through them, as a carrier traveling in the main-tube A′ successively opens and passes through the valves which automatically close. The momentum of the carriers and the suction created by air passing through the pipe $a^2$ continue them from the valves F to a point where they again meet an air current from the outgoing substation pipe $a^2$, and hence it is preferable to locate said valves as near to said point as possible in order that the carrier may almost instantly meet the air currents from the sub-stations after passing through the valves F. The use of the latter admits of an air current through the main-tube and through all the sub-station tubes for delivering the carriers to and sending them from any one of the sub-stations by way of tube A′.

To indicate at the main-station the passage of a carrier through a valve F an electric signal, indicator or registering circuit $f^3$ is provided for each valve, see Fig. 3, which is normally open and has one of its terminals in casing $f$ adjacent to one section of the valves F which section is suitably grounded or connected to the other end of said circuit so that when a valve F is opened by the passage of a carrier, the opened circuit $f^3$ for said valve is closed to actuate the indicator-signal or register.

Figure 34:
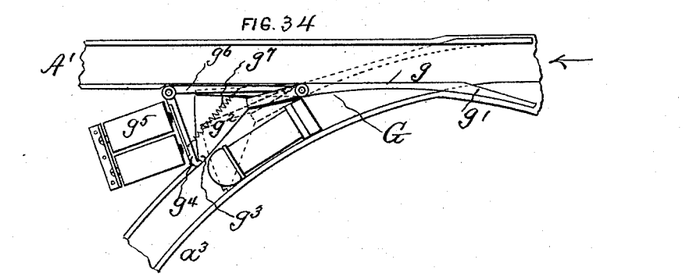
Fig. 34, is an enlarged view of part of Fig. 32, showing a carrier passing into the inlet tube of a sub-station and resetting the carrier diverting switch.
Figure 35:
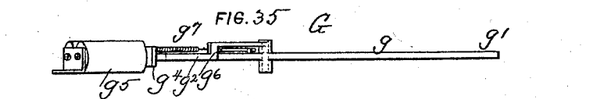
Fig. 35, is an edge view of said diverting switch and electro-magnetic devices therefor detached from the coupling boxes.
Figure 36:
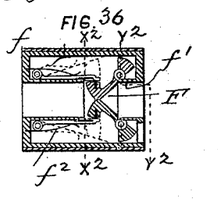
Fig. 36, is an enlarged sectional view of valve shown in Fig. 32.
Figure 37:
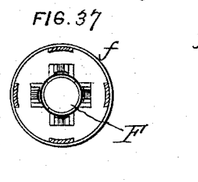
Fig. 37, is a section on line $x^2$ $x^2$
Figure 38:
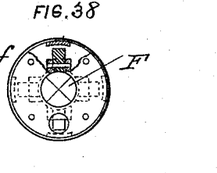

The carrier diverting switches G see Figs. 3 and 34, consist of a pivoted lever $g$ the outer end $g'$ of which, when in position to do so, aligns with the tube A′ see Fig. 34, so as not to obstruct the passage of a carrier through tube A′ and when moved into the latter tube it diverts the carrier from the tube A′ into the sub-station tube $a^3$. The lever $g$ has a tail-piece $g^2$ which may be integral with lever $g$ or separate therefrom, mounted on the same pivot, and having an engagement with said lever, see Figs. 34 and 35, as desired. This tail piece $g^2$ has an indent or recess $g^3$ for engagement with the end of an armature lever $g^4$ for electro-magnets $g^5$ and upon the pivot of armature lever $g^4$ is pivoted a lever $g^6$ which engages with the lever $g$ or its tail piece $g^2$ and said levers $g^4$ and $g^6$ are connected by a spiral or other spring $g^7$, see more plainly in Fig. 34. The electro magnets $g^5$ are in an electric circuit including a switch at the central or main station so that said switches are operated from the central station as fully set forth in United States Letters Patent granted to me November 4 1884 No. 307,437. When any one of the switches G is in its normal position to admit of carriers passing through the main tube A' as shown by full lines in Fig. 34, the tail piece $g^2$ of lever $g$ is in locking engagement with armature lever $g^4$ to maintain said switch in such position. When the electro magnets $g^5$ are energized from the central or main office the armature lever $g^4$ is attracted to release it from tail-piece $g^2$ and the spring $g^7$ then acts through the medium of lever $g^6$ to throw lever $g$ across the main tube A' and move the tail piece $g^2$ of said lever into the substation inlet tube $a^3$ to divert the carrier from tube A' to tube $a^3$ and as the carrier travels through the latter tube it meets and raises the tail-piece $g^2$ to move the lever $g$ into its normal position or into locking engagement with the armature lever $g^4$. The object of using the separate armature lever $g^4$ and lever $g^6$ connected by the spring $g^7$ is to obtain a quicker movement of the lever $g$ and a better or more secure locking engagement for said lever which engagement is not liable to be accidentally released.

The anti-blocking carrier device H consists of two separate pivoted levers $h$ $h'$, the lever $h$ being shorter and is located back of and resting upon the lever $h'$, suitable cam faces being formed on the contiguous parts of said levers, as shown in Figs. 3 and 32. Said levers describe arcs of different radii, and hence when moved by a carrier passing out of sub-station pipe $a^2$ the short lever $h$ is raised or thrown across the tube A' in advance of lever $h'$ and stops any carrier that may be traveling in that part of tube A' at the time a carrier is passing out of tube $a^2$. As the stopping of the carrier in tube A' is effected by the short lever $h$ and as the larger lever $h'$ is still free to move owing to the cam faces on said levers, the carrier in the tube $a^2$ pushes lever $h'$ aside independently of lever $h$, and passes into tube A' whereupon said levers fall to admit of the onward movement of the carrier in tube A' temporarily checked or held up by the short lever $h$, the carrier in the tube A' is again started by the suction created by the air issuing from the tube $a^2$ into the main tube.

Figure 5:
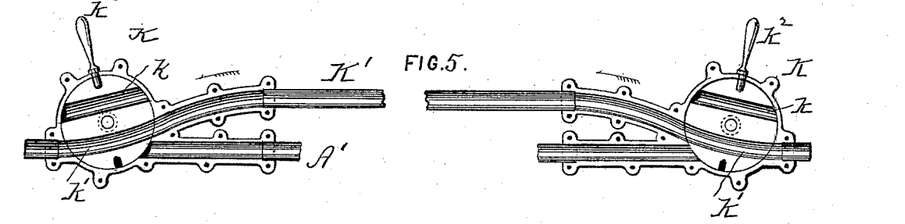
Fig. 5, is a plan view, with top-plates removed, and partly broken away, of a portion of the main tube plug-switches therein and separate or bridge tube connecting the plug-switches for diverting the path of the air current or flow and the carriers around a faulty substation or other switch or other part of the system.

The shunt-plugs K see more plainly Figs. 5 and 29–31 inclusive consist of coupling boxes having passage ways $k$ $k'$ for continuing therethrough the tubes of the system to which they are connected and also for a separate bridge-pipe K' connecting two of such shunt plugs, see more plainly Fig. 5; said couplings being provided with suitable casings for the plugs K, and having actuating handle $k^2$. When said plugs are moved in one position the way $k$ is brought into alignment with the tubes A' of the system see Fig. 30, to permit the carriers to pass therethrough and this position is the normal one for the shunt plugs. A movement in an opposite direction brings the plug way $k'$ into connection or alignment with the bridge pipe K' and the tubes of the system, cutting out that part of the latter between the shunt-plugs and diverting around it, the air current and the carriers. The shunt-plugs K are only used when a fault occurs in the tubes of the system between the plugs K, and as such fault necessitates repairing or replacement the same can be quickly and promptly effected without stopping or closing the whole line to traffic; the only part of the system not then in service is that part in which the repairs are being effected.

From the foregoing it will be noted that each sub-station Fig. 1, is provided with a coupling box E, a carrier diverting switch G, an air current diverting valve F, carrier antiblocking devices H, a transmitter I, a receiving and delivery device D and shunt plugs K with bridge K'; that the air current passes from the main station successively through each sub-station so that there is a constant flow from end to end of the line, said air currents escaping from the end $a'$ of the tube circuit. If a governor $b$ is applied to said end $a'$, the escape of the air may be regulated as desired but such governor is not essential and need not be used. The reservoir B prevents the pulsations of the pump being felt in the tubes A or in other words it provides for a steady and continuous current of the desired velocity.

A carrier to be transmitted from the central station is inserted in the transmitter C and by it is moved into the air current in tube A' and is carried or propelled to the sub-station desired, the switch G for said sub-station being electrically released from the central or main station, the carrier is diverted from the tube A' to the said sub-station, and is delivered by the receiver D. A carrier sent from a sub-station is placed in its transmitter I and passes out of its tube $a^2$ into the tube A' to the receiver D at the main-station.

Any number of carriers can be successively inserted into the system at the main and sub-stations without interference and all travel at the same speed and normally follow each other without gaining upon one another as the velocity of the air current or circulation in the system is constant, and without permitting such air to escape at any of the transmitting and receiving devices.

The single tube-circuit shown in Fig. 1, represents the simplest form of my system, but it is evident that the improvements are equally applicable to various arrangements of single tube-circuits or circuits having separate outgoing and ingoing tubes common to all the sub-stations as fully shown described and claimed in my aforesaid United States Letters Patent, as well as to other systems heretofore known.

Figure 2:
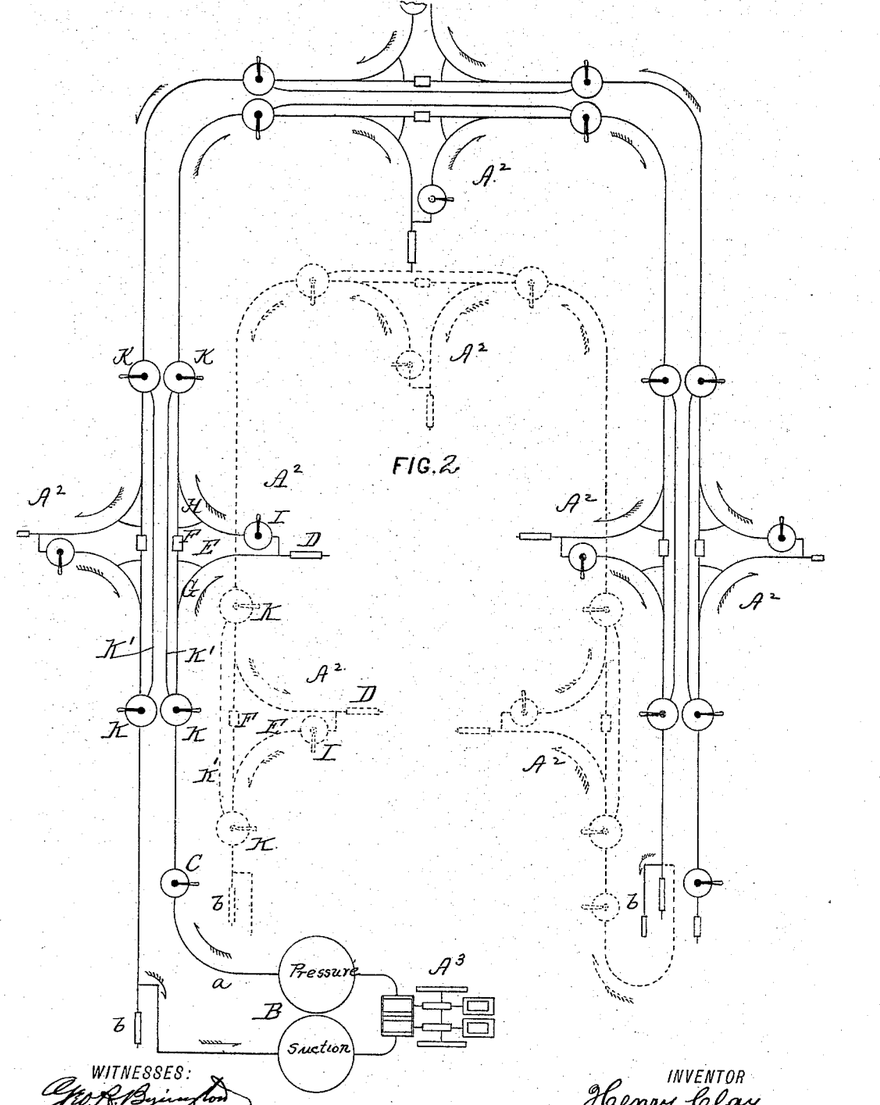
Fig. 2, is a like view of double tube circuits one connected to the pressure and the other to the vacuum side of the pump to produce the currents or flow of air in said tubes in reverse directions, suitable for use with systems including sublines as well as main lines.

In Fig. 2, a more complex system is shown in which one tube circuit is shown connected to the pressure side of the pump and another tube circuit is connected to the suction side of the pump. The air currents in said circuits as indicated in the figure are in reverse directions and this form is especially applicable for use with sub-line circuits as fully set forth in another pending application of same date herewith, Serial No. 328,360.

Figures 6, 7:
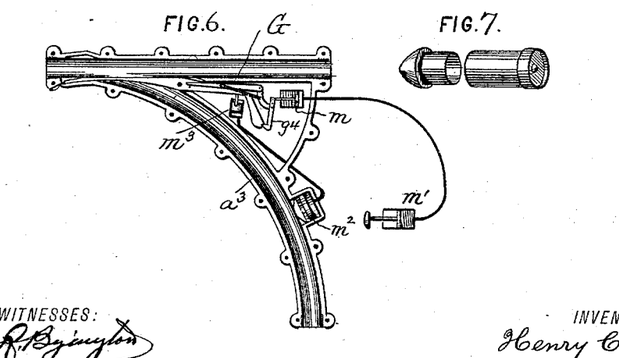
Fig. 6, is a like view of a carrier-diverting switch and coupling-box with pneumatic or hydrostatic devices for controlling the same from the main station.
Fig. 7, is a perspective, showing the parts of a form of carrier.
Figures 25, 26, 27:
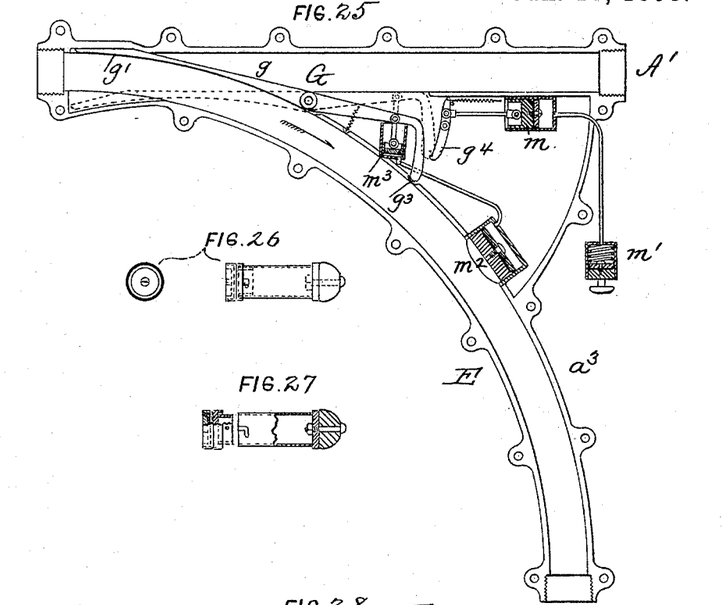
Fig. 25, is an enlarged view of the pneumatic or hydro-static carrier diverting switch shown in Fig. 6, showing modified details.
Figs. 26 and 27 are respectively an elevation and sectional elevation of another form of carrier.
Figure 28:
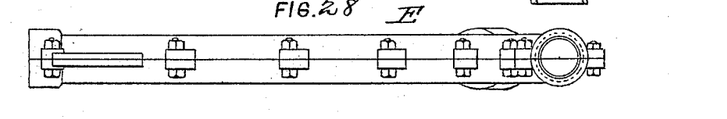
Fig. 28, is an edge view of coupling-box for carrier diverting switch.
Figures 29, 31:
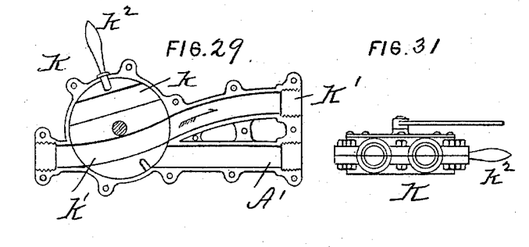
Figs. 29 and 30, are plan views with top-plate or half removed, of the plug switch coupling-boxes shown in Fig. 5, showing the switch in two different positions.
Fig. 31, is an edge view of the same.
Figure 30:
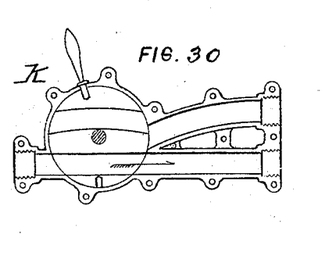

Any suitable form of carriers may be used as indicated in Figs. 7, 26 and 27. The first named showing the usual telescoping cylindrical carrier, and the latter a similar form, but in addition thereto the sections have bayonet joints for firmly holding them together so as not to become separated as the carrier is propelled through the tubes.

Figures 10, 11, 12, 13:
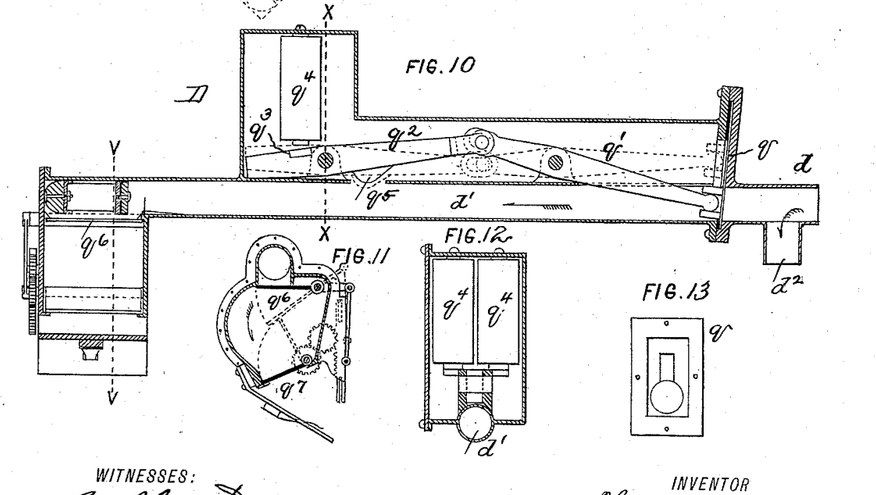
Fig. 10, is a sectional elevation of another form of receiving and delivering device showing carrier about to be delivered from the same.
Fig. 11, is a section on the line $v$—$v$ Fig. 10.
Fig. 12, is a section on the line $x$—$x$ Fig. 10.
Fig. 13, is a plan of the gate or valve at the inlet end of the receiver shown in Fig. 10.
Figure 39:
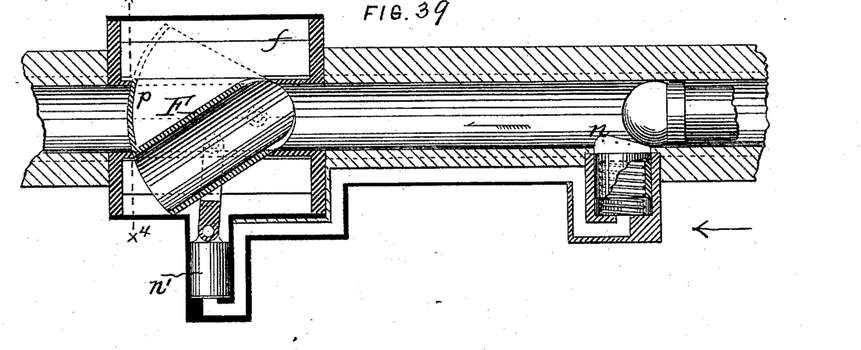
Fig. 39, is a sectional view of another modified form of air current diverting valve with pneumatic controlling devices operated by the movement of the carriers in the main tube.
Figure 40:
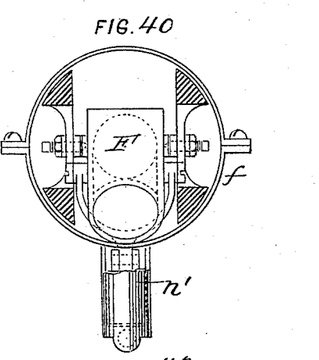
Fig. 40, is a section on the line $x^4$ $x^4$ Fig. 39.
Figure 41:
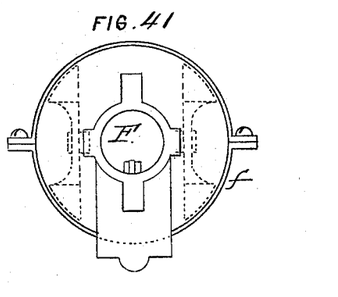
Fig. 41, is an end view of same looking in the direction of arrow in Fig. 39, and Figs. 42, 43, 44 and 45, are elevations from different points of view of the valve shown in Fig. 39.
Figure 42:
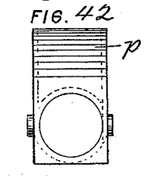
Figure 43:
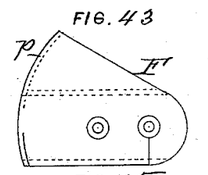
Figure 44:
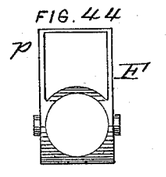
Figure 45:
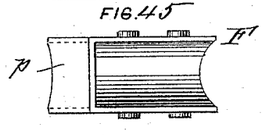

It is obvious that the construction of the above described parts as well as their mode of operation may be greatly varied within the spirit of my invention and hence I do not limit myself to the same as shown and set forth. Thus for instance Figs. 32 and 36 to 38, show a modified form of air current diverting valve F and closing springs therefor which is substantially a reversal of that shown in Fig. 3. So too instead of electrically releasing the locking mechanism for the carrier diverting switches G, such release may be pneumatically or hydrostatically effected. A form of which modification is shown in Figs. 6 and 25, wherein the electro magnets and armature are dispensed and a cylinder and a piston $m$ connected to locking lever $g^4$ and under control of similar cylinder and piston $m'$ at central office are substituted. In this case the tail piece $g^2$ of lever $g$ does not extend into the tube $a^3$ and in lieu thereof an air or water piston end $m^2$ projects into tube $a^3$ and is actuated by the carrier as it passes by to in turn actuate a second like piston $m^3$ connected to the lever $g$ for returning it to its normal position. Similar pneumatic or hydrostatic devices operated by the carriers may be connected with valves F as shown in Fig. 39, wherein $n$ is the piston or spring supported plunger projecting into the tube A′ to be depressed by the carrier and which actuates the plunger $n'$ to raise the valve F before the carrier reaches the same. In this case the valve is shown as a tubular one and provided with a gate or leaf $p$ for closing it to divert the air-current to the sub-stations. The detail parts of said valves being fully shown in Figs. 40–45 inclusive. Again instead of using the form of receivers D shown in Figs. 8 and 14, modification of same indicated in Figs. 10 and 16, may be substituted. In that in Fig. 10, no sliding and tilting barrel $d^{15}$ is used, but in lieu thereof the tube $d'$ is continued on, and is provided with a slide gate or valve $q$, see Figs. 13 and 19, to prevent escape of air. This gate $q$ has a connection with two pivoted levers $q'$ $q^2$ which are also pivoted to one another, the lever $q^2$ carrying an armature $q^3$ for electro-magnets $q^4$ see Figs. 12 and 18, and a tail piece $q^5$ to project into the pipe $d'$ for the carriers to contact with. An attraction of the magnets $q^4$ oscillates levers $q'$ $q^2$ to depress the tail piece $q^5$ on one of them, into pipe $d'$ and to cause the other lever to raise gate $q$ and allow the incoming carrier to pass by the same and travel through the pipe $d'$. The carrier in passing through pipe $d'$ contacts with the tail piece $q^5$ and reversely moves levers $q'$ $q^2$ to close gate $q$. When the carrier reaches the end of pipe $d'$ it rests on a tilting valve $q^6$ which the weight of the carrier tilts to allow the carrier to either drop out of the system, see Fig. 17, or drop upon a second tilting plate $q^7$ which may be correspondingly actuated while the first named plate $q^6$ is closing and the carrier escapes from the system, see Fig. 16. If desired however said two tilting plates $q^6$ $q^7$ may be connected together and have locking devices as indicated in Fig. 11, but this is not essential.

From the foregoing, it will be noted that a main line tube passes out from and returns to the central station, so that each tube leading therefrom is or forms a complete circuit in itself and all the sub-stations connected thereto have their inlet and outlet pipes joined to the one or the same side of said main tubes and not to different sides or to the outgoing and returning sides of the same; and to effect this the said sub-station inlet and outlet tubes have reverse curved junctions with the main tubes as shown. Such construction admits of the provision of any desired number of substations or branch lines from end to end of the main tube. It will be further noted that, by locating the valves F for each sub-station in the main line between the inlet and outlet ends of the substation tubes joined to the main line, only a single valve F need be used for each substation for causing the motive power to successively pass to each of the sub-stations throughout the tube-circuit.

What I claim is:—

1. In a pneumatic dispatch system, the combination of a line of main-tubing, substation inlet and outlet tubes joined to one or the same side of said main-tubing, and a valve in the main tube between said sub-station inlet and outlet tube junctions constructed and arranged for admitting of the passage of the carrier through and beyond it and for normally causing the motive force to travel or act through said main tubing and into and through each sub-station and back again to the main-tubing successively throughout the line of said main-tubing, substantially as set forth.

2. In a pneumatic dispatch system, the combination of a circuit of main tubing leading from and back to a central or main station, a series of substation inlet and outlet pipes in connection with the main-tubing, separate carrier transmitting and receiving appliances at said main-station and at each sub-station, and a single valve in the main tube between said substation inlet and outlet junctions constructed and arranged for admitting of the passage of the carrier through and beyond it and for normally causing the motive force to travel or act through said main tubing and into and through each sub-station and back again to the main tubing successively from end to end of the same, substantially as set forth.

3. In a pneumatic dispatch system the combination of a single-tube-circuit having at one end an air current creating device and a transmitter for inserting carriers into said tube, the other end of said tube being open to the atmosphere and having a receiving device for delivering carriers from said tube, sub-station inlet and outlet tubes joined to one or the same side of said main tube, and carrier transmitting and delivery devices for said sub-stations, substantially as set forth.

4. A pneumatic dispatch tube system comprising a main station, a number of sub-stations, means for causing a continuous flow of air to continuously pass through all the sub-stations successively from end to end of the line without escaping at said sub-stations, and an open end for one end of the system from which said current escapes, substantially as set forth.

5. In a pneumatic dispatch tube system, the combination of line-tubes, inlet and outlet substation tubes joined to said line-tubes and to each other, valves in the line-tubes constructed to allow the passage of carriers through them and to deflect the air current from the line tubes through the sub-station tubes back to the line-tubes, substantially as set forth.

6. In a pneumatic dispatch tube system the combination of an outgoing pipe and a valve F in said pipe constructed and arranged to allow the passage through it of a carrier and to deflect the air current or power from and back to said pipe, substantially as set forth.

7. In a pneumatic dispatch tube system the combination of a line tubing having a branch-tube, a valve in the line-tubing which allows the passage through it of a carrier and which deflects the air from the line tubing into and through said branch-tube, and a carrier diverting switch at the junction of the branch and line tubing, substantially as set forth.

8. In a pneumatic dispatch tube system the combination of a line tubing having sub-station inlet and outlet tubes, a valve in the line-tubing between said sub-station inlet and outlet tubes, which allows the passage of a carrier through it and deflects the air from said line tubing to and through the sub-station tubes back to the line tubing and a carrier diverting switch at the junction of said line and sub-station inlet tube, substantially as set forth.

9. In a pneumatic dispatch tube system, the combination of a line tubing having sub-station inlet and outlet tubes, a valve in the line-tubing between said sub-station tubes, which allows the passage through it of a carrier and which deflects the air from the line tubing into and through said sub-station tubes back again to the line tubing, a carrier diverting switch at the junction of the line and sub-station inlet tubes, and carrier anti-jamming levers at the junction of the line and sub-station outlet tube, substantially as set forth.

10. In a pneumatic dispatch tube system, the combination of a line tube, a branch tube, a valve in the line tube which allows the passage of a carrier through it and deflects the air into the branch tube an electric-circuit, and an indicator operated by said valve when a carrier passes through it, substantially as set forth.

11. In a pneumatic dispatch system the combination of a tube and a branch tube, a normally closed valve which is opened by the passage of a carrier through it, and which deflects the air from one to the other of said tubes, and an electric-circuit and indicator actuated by said valve when opened, substantially as set forth.

12. In a pneumatic dispatch tube system the combination of a main line tube open at one end, a carrier receiving device connected to said tube near its open end, a valve in said receiving device normally closed to the air pressure in said tube, an air current generating device an air-reservoir, and a carrier transmitting device at the opposite end of said tube; substation or branch-inlet and outlet tubes joined to said main-line, and carrier transmitting and receiving devices in said sub-station or branch tubes, substantially as set forth.

13. In a pneumatic dispatch tube system the combination of main and branch or sub-station tubes, valves in said tubes which allow the passage through them of the carriers and which deflect the air from one to the other of said tubes, carrier diverting switches at the junction of said tubes, and carrier transmitting and receiving devices, substantially as set forth.

14. In a pneumatic dispatch tube system the combination of a line tube, shunt-plugs joined to said tube, and a bridge-tube connecting said shunt plugs whereby the air and carriers can be shunted from the line tube to the bridge tube and from the latter to the former, substantially as set forth.

15. In combination with a pneumatic dispatch tube, a carrier transmitter comprising a closed casing having a carrier opening, a rotating plug within said casing and having a carrier opening air passages in said plug separate from the carrier opening, whereby the carrier can be inserted into the transmitter and placed into the line of the dispatch tube without escape of air from the transmitter and without affecting the flow of air in the tube substantially as set forth.

16. In combination with a pneumatic dispatch tube, a carrier receiving device having a longitudinally sliding and tilting tube actuated by the carrier for effecting its delivery from said tube substantially as set forth.

17. In combination with a pneumatic dispatch tube, a carrier receiving device having an air inlet-end, a shunt or outlet pipe communicating with said inlet-end, a movable valve for the latter, a longitudinally moving and tilting tube actuated by the carrier for effecting its delivery from said tube, substantially as set forth.

18. In combination with a pneumatic dispatch tube, a coupling box having communicating inlet and outlet passages, and chamber $d^5$ with opening $d^6$, a movable valve in said chamber, a longitudinally sliding and tilting barrel or receiver tube, locking mechanism for retaining said receiver-tube in position with one of its ends in said chamber, and devices actuated by a carrier passing into said receiver tube to effect a release of said locking mechanism and a sliding and tilting movement of said receiver tube to deliver the carrier therefrom, substantially as set forth.

19. In combination with a main and branch tube junction of a pneumatic dispatch tube system, two independently pivoted levers bearing one upon the other and movable together in one direction by the contact of a carrier with one of said levers and movable together in the opposite direction by the contact of a carrier with the other of said levers, substantially as specified.

20. In a pneumatic dispatch system, the combination of two lines of tubes both provided with carrier transmitting and receiving devices, and each tube having an open terminal end, the other ends of said tubes being connected respectively with the suction and pressure side of a pump or current generating device so as to have in each tube a separate air-flow, current or pressure in opposite directions, and air chambers or reservoirs in each of said tubes between the pump and their carrier transmitting or receiving devices, substantially as shown and described.

21. In a pneumatic dispatch system, the combination of two separate tubes having carrier transmitting and receiver devices and means connected to said tubes for creating air currents or pressure in different directions in each said tube, and air chambers or reservoirs in each said tubes between the pump and their carrier transmitting or receiving devices, substantially as shown and described.

In testimony whereof I affix my signature in presence of two witnesses.

HENRY CLAY.

Witnesses:
GEO. R. BYINGTON,
S. J. VAN STAVOREN.